US012094429B2

(12) United States Patent
Lin et al.

(10) Patent No.: US 12,094,429 B2
(45) Date of Patent: Sep. 17, 2024

(54) METHOD FOR DRIVING ELECTROPHORETIC DISPLAY DEVICE

(71) Applicant: E INK CORPORATION, Billerica, MA (US)

(72) Inventors: Craig Lin, Fremont, CA (US); Xiaolong Zheng, Fremont, CA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/475,643

(22) Filed: Sep. 27, 2023

(65) Prior Publication Data

US 2024/0021168 A1 Jan. 18, 2024

Related U.S. Application Data

(63) Continuation of application No. 18/191,592, filed on Mar. 28, 2023, now Pat. No. 11,804,190, which is a continuation of application No. 17/819,371, filed on Aug. 12, 2022, now Pat. No. 11,640,803.

(60) Provisional application No. 63/241,027, filed on Sep. 6, 2021.

(51) Int. Cl.
*G09G 3/34* (2006.01)

(52) U.S. Cl.
CPC ..... *G09G 3/344* (2013.01); *G09G 2310/0254* (2013.01)

(58) Field of Classification Search
None
See application file for complete search history.

(56) References Cited

U.S. PATENT DOCUMENTS

| | | | |
|---|---|---|---|
| 6,017,584 | A | 1/2000 | Albert et al. |
| 6,504,524 | B1 | 1/2003 | Gates et al. |
| 6,531,997 | B1 | 3/2003 | Gates et al. |
| 6,545,797 | B2 | 4/2003 | Chen et al. |
| 6,664,944 | B1 | 12/2003 | Albert et al. |

(Continued)

OTHER PUBLICATIONS

Korean Intellectual Property Office, "International Search Report and Written Opinion", PCT/US2022/074894, Nov. 30, 2022. Nov. 30, 2022.

*Primary Examiner* — Matthew Yeung
(74) *Attorney, Agent, or Firm* — Brian D. Bean

(57) ABSTRACT

An electrophoretic medium comprises a fluid and first (B), second (Y), third (R) and fourth (W) particles dispersed in the fluid and having differing colors. The first (B) and third (R) particles bear charges of one polarity and the second (Y) and fourth (W) particles bear charges of the opposite polarity, The first particles (B) have a greater zeta potential than the third particles (R), and the second particles (Y) have a greater zeta potential than the fourth particles (W). One of the particles (W) is white, one of the non-white particles (B) is partially light-transmissive, and the remaining two non-white particles are light-reflective. To display the color of a mixture of the first (B) and second (Y) particles at a viewing surface, the medium is driven to display the second particles (Y) at the viewing surface, then a first driving voltage is applied for a first period to drive the second (Y) and fourth (W) particles towards the viewing surface, then a second driving voltage, of opposite polarity to and lower magnitude than, the first voltage, is applied for a second period less than the first period, and finally the applications of the two driving voltages are repeated.

12 Claims, 18 Drawing Sheets

(56) References Cited

U.S. PATENT DOCUMENTS 6,788,452 B2 9/2004 Liang et al.
6,825,829 B1 11/2004 Albert et al.
6,864,875 B2 3/2005 Drzaic et al.
6,866,760 B2 3/2005 Paolini, Jr. et al.
6,914,714 B2 7/2005 Chen et al.
6,922,276 B2 7/2005 Zhang et al.
6,930,818 B1 8/2005 Liang et al.
6,972,893 B2 12/2005 Chen et al.
6,982,178 B2 1/2006 LeCain et al.
7,002,728 B2 2/2006 Pullen et al.
7,012,600 B2 3/2006 Zehner et al.
7,038,656 B2 5/2006 Liang et al.
7,038,670 B2 5/2006 Liang et al.
7,046,228 B2 5/2006 Liang et al.
7,052,571 B2 5/2006 Wang et al.
7,072,095 B2 7/2006 Liang et al.
7,075,502 B1 7/2006 Drzaic et al.
7,112,114 B2 9/2006 Liang et al.
7,116,318 B2 10/2006 Amundson et al.
7,144,942 B2 12/2006 Zang et al.
7,158,282 B2 1/2007 Liang et al.
7,167,155 B1 1/2007 Albert et al.
7,236,292 B2 6/2007 LeCain
7,312,784 B2 12/2007 Baucom et al.
7,385,751 B2 6/2008 Chen et al.
7,411,719 B2 8/2008 Paolini, Jr. et al.
7,443,571 B2 10/2008 LeCain et al.
7,453,445 B2 11/2008 Amundson
7,492,505 B2 2/2009 Liang et al.
7,513,813 B2 4/2009 Paolini, Jr. et al.
7,535,624 B2 5/2009 Amundson et al.
7,561,324 B2 7/2009 Duthaler et al.
7,636,191 B2 12/2009 Duthaler et al.
7,649,666 B2 1/2010 Isobe et al.
7,667,684 B2 2/2010 Jacobson et al.
7,679,814 B2 3/2010 Paolini, Jr. et al.
7,684,108 B2 3/2010 Wang et al.
7,715,088 B2 5/2010 Liang et al.
7,728,811 B2 6/2010 Albert et al.
7,729,039 B2 6/2010 LeCain et al.
7,791,782 B2 9/2010 Paolini, Jr. et al.
7,791,789 B2 9/2010 Albert et al.
7,800,813 B2 9/2010 Wu et al.
7,821,702 B2 10/2010 Liang et al.
7,826,129 B2 11/2010 Wu et al.
7,839,564 B2 11/2010 Whitesides et al.
7,843,621 B2 11/2010 Danner et al.
7,843,624 B2 11/2010 Danner et al.
7,910,175 B2 3/2011 Webber
7,952,790 B2 5/2011 Honeyman et al.
7,956,841 B2 6/2011 Albert et al.
7,982,941 B2 7/2011 Lin et al.
8,009,348 B2 8/2011 Zehner et al.
8,034,209 B2 10/2011 Danner et al.
8,040,594 B2 10/2011 Paolini, Jr. et al.
8,054,526 B2 11/2011 Bouchard
8,068,272 B2 11/2011 LeCain et al.
8,077,381 B2 12/2011 LeCain et al.
8,098,418 B2 1/2012 Paolini, Jr. et al.
8,159,636 B2 4/2012 Sun et al.
8,177,942 B2 5/2012 Paolini, Jr. et al.
8,213,076 B2 7/2012 Albert et al.
8,363,299 B2 1/2013 Paolini, Jr. et al.
8,390,301 B2 3/2013 Danner et al.
8,422,116 B2 4/2013 Sprague et al.
8,441,714 B2 5/2013 Paolini, Jr. et al.
8,441,716 B2 5/2013 Paolini, Jr. et al.
8,466,852 B2 6/2013 Drzaic et al.
8,482,835 B2 7/2013 LeCain
8,503,063 B2 8/2013 Sprague
8,576,470 B2 11/2013 Paolini, Jr. et al.
8,576,475 B2 11/2013 Huang et al.
8,593,721 B2 11/2013 Albert et al.
8,605,354 B2 12/2013 Zhang et al.
8,649,084 B2 2/2014 Wang et al.
8,670,174 B2 3/2014 Sprague et al.
8,687,265 B2 4/2014 Ahn et al.
8,704,756 B2 4/2014 Lin
8,717,664 B2 5/2014 Wang et al.
8,786,929 B2 7/2014 LeCain et al.
8,786,935 B2 7/2014 Sprague
8,797,634 B2 8/2014 Paolini, Jr. et al.
8,810,899 B2 8/2014 Sprague et al.
8,830,553 B2 9/2014 Patry et al.
8,830,559 B2 9/2014 Honeyman et al.
8,854,721 B2 10/2014 Danner et al.
8,873,129 B2 10/2014 Paolini, Jr. et al.
8,902,153 B2 12/2014 Bouchard et al.
8,902,491 B2 12/2014 Wang et al.
8,917,439 B2 12/2014 Wang et al.
8,964,282 B2 2/2015 Wang et al.
9,013,516 B2 * 4/2015 Sakamoto .............. G09G 3/344 345/690
9,013,783 B2 4/2015 Sprague
9,075,280 B2 7/2015 Whitesides
9,116,412 B2 8/2015 Lin
9,146,439 B2 9/2015 Zhang
9,164,207 B2 10/2015 Honeyman et al.
9,170,467 B2 10/2015 Whitesides et al.
9,170,468 B2 10/2015 Lin et al.
9,182,646 B2 11/2015 Paolini, Jr. et al.
9,195,111 B2 11/2015 Anseth et al.
9,199,441 B2 12/2015 Danner
9,238,340 B2 1/2016 Kayal et al.
9,268,191 B2 2/2016 Paolini, Jr. et al.
9,279,906 B2 3/2016 Kang
9,285,649 B2 3/2016 Du et al.
9,293,511 B2 3/2016 Jacobson et al.
9,341,916 B2 5/2016 Telfer et al.
9,360,733 B2 6/2016 Wang et al.
9,361,836 B1 6/2016 Telfer et al.
9,383,623 B2 7/2016 Lin et al.
9,423,666 B2 8/2016 Wang et al.
9,436,056 B2 9/2016 Paolini, Jr. et al.
9,459,510 B2 10/2016 Lin
9,470,950 B2 10/2016 Paolini, Jr. et al.
9,501,981 B2 11/2016 Lin et al.
9,513,527 B2 12/2016 Chan et al.
9,541,814 B2 1/2017 Lin et al.
9,552,780 B2 1/2017 Telfer et al.
9,554,495 B2 1/2017 Danner et al.
9,563,099 B2 2/2017 LeCain et al.
9,640,119 B2 5/2017 Lin et al.
9,646,547 B2 5/2017 Lin et al.
9,671,668 B2 6/2017 Chan et al.
9,697,778 B2 7/2017 Telfer et al.
9,726,959 B2 8/2017 Whitesides et al.
9,733,540 B2 8/2017 LeCain et al.
9,740,076 B2 8/2017 Paolini, Jr. et al.
9,759,980 B2 9/2017 Du et al.
9,759,981 B2 9/2017 Wang et al.
9,761,181 B2 9/2017 Chan et al.
9,778,536 B2 10/2017 LeCain et al.
9,778,538 B2 10/2017 Telfer et al.
9,779,670 B2 10/2017 Uesaka et al.
9,779,671 B2 10/2017 Gan et al.
9,812,073 B2 11/2017 Lin et al.
9,829,764 B2 11/2017 Paolini, Jr. et al.
9,835,925 B1 12/2017 Bull et al.
9,921,451 B2 3/2018 Telfer et al.
9,922,603 B2 3/2018 Lin
9,989,829 B2 6/2018 Telfer et al.
10,032,419 B2 7/2018 Lin et al.
10,036,929 B2 7/2018 Du et al.
10,036,931 B2 7/2018 Chan et al.
10,147,366 B2 12/2018 Lin et al.
10,162,242 B2 12/2018 Wang et al.
10,209,556 B2 2/2019 Rosenfeld et al.
10,234,742 B2 3/2019 Chan et al.
10,332,435 B2 6/2019 Wang et al.
10,339,876 B2 7/2019 Lin et al.
10,353,266 B2 7/2019 Bouchard et al.
10,366,647 B2 7/2019 Szymborski
10,372,010 B2 8/2019 Du et al.

(56) References Cited

U.S. PATENT DOCUMENTS

| | | | |
|---|---|---|---|
| 10,380,931 | B2 | 8/2019 | Lin et al. |
| 10,380,955 | B2 | 8/2019 | Lin |
| 10,386,693 | B2 | 8/2019 | Moriwaki |
| 10,431,168 | B2 | 10/2019 | Lin et al. |
| 10,444,591 | B2 | 10/2019 | Honeyman et al. |
| 10,444,592 | B2 | 10/2019 | Bouchard |
| 10,466,564 | B2 | 11/2019 | Kayal et al. |
| 10,467,984 | B2 | 11/2019 | Buckley et al. |
| 10,475,399 | B2 | 11/2019 | Telfer et al. |
| 10,509,293 | B2 | 12/2019 | Telfer et al. |
| 10,514,583 | B2 | 12/2019 | Zhang |
| 10,586,499 | B2 | 3/2020 | Lin et al. |
| 10,782,586 | B2 | 9/2020 | Liu et al. |
| 10,891,906 | B2 | 1/2021 | Lin |
| 10,901,288 | B2 | 1/2021 | Takada et al. |
| 11,151,951 | B2 | 10/2021 | Lin et al. |
| 11,462,182 | B2 | 10/2022 | Lin et al. |
| 11,640,803 | B2 | 5/2023 | Lin et al. |
| 11,804,190 | B2 | 10/2023 | Lin et al. |
| 2007/0237962 | A1 | 10/2007 | Liang et al. |
| 2008/0043318 | A1 | 2/2008 | Whitesides et al. |
| 2008/0048970 | A1 | 2/2008 | Drzaic et al. |
| 2009/0168067 | A1 | 7/2009 | LeCain et al. |
| 2009/0225398 | A1 | 9/2009 | Duthaler et al. |
| 2010/0156780 | A1 | 6/2010 | Jacobson et al. |
| 2011/0043543 | A1 | 2/2011 | Chen et al. |
| 2011/0164301 | A1 | 7/2011 | Paolini, Jr. et al. |
| 2012/0326957 | A1 | 12/2012 | Drzaic et al. |
| 2013/0242378 | A1 | 9/2013 | Paolini, Jr. et al. |
| 2013/0278995 | A1 | 10/2013 | Drzaic et al. |
| 2014/0055840 | A1 | 2/2014 | Zang et al. |
| 2014/0078576 | A1 | 3/2014 | Sprague |
| 2015/0118390 | A1 | 4/2015 | Rosenfeld et al. |
| 2015/0268531 | A1 | 9/2015 | Wang et al. |
| 2015/0301246 | A1 | 10/2015 | Zang et al. |
| 2016/0048054 | A1 | 2/2016 | Danner |
| 2016/0246155 | A1 | 8/2016 | Loxley et al. |
| 2016/0275874 | A1* | 9/2016 | Lin ...................... G09G 3/2011 |
| 2017/0103709 | A1* | 4/2017 | Lin ........................ G09G 3/344 |
| 2021/0382369 | A1 | 12/2021 | Zheng et al. |

* cited by examiner

METHOD FOR DRIVING ELECTROPHORETIC DISPLAY DEVICE

REFERENCE TO RELATED APPLICATIONS

This application is a continuation of U.S. patent application Ser. No. 18/191,592, filed Mar. 28, 2023, which is a continuation of U.S. patent application Ser. No. 17/819,371, filed Aug. 12, 2022 (now U.S. Pat. No. 11,640,803), which claims the benefit of U.S. Provisional Patent Application Ser. No. 63/241,027, filed Sep. 6, 2021.

This application is also related to U.S. Pat. Nos. 9,170,468; 9,361,836; 9,513,527; 9,640,119; 9,812,073; 10,147,366; 10,234,742; 10,431,168; 10,509,293; 10,586,499; and 10,782,586, and application Ser. No. 17/339,216, filed Jun. 4, 2021 (Publication No. 2021/0382369).

The entire contents of the aforementioned patents and application, and of all other U.S. patents and published and applications mentioned below, are herein incorporated by reference.

BACKGROUND OF INVENTION

The aforementioned patents and published applications describe electrophoretic media, methods for driving such media, and electrophoretic display devices incorporating such media. The electrophoretic media comprise a fluid and first, second, third and fourth types of particles dispersed in the fluid; such media may hereinafter be referred to a "four particle electrophoretic media". The four types of particles have optical characteristics (typically colors) differing from each other. The first type of particles carry a high positive charge and the second type of particles carry a high negative charge. The third type of particles carry a low positive charge and the fourth type of particles carry a low negative charge. (The charge intensity is measured in terms of zeta potential.) In the electrophoretic display device, the electrophoretic medium is disposed between a front electrode and a rear electrode, with the display normally being viewed from the front electrode (viewing) side. In a typical multi-pixel display, the front electrode is continuous, extending across multiple pixels and typically the entire display, while a separate rear electrode is provided for each pixel to enable the displayed color to be controlled on a pixel-by-pixel basis.

The optical characteristics of the first and second types of particles can (in principle) be displayed at the viewing side by applying a high electric field of appropriate polarity across the electrophoretic medium for a period sufficient to enable the first or second types of particles to lie adjacent the front electrode. To display the optical characteristic of the third type of particles, the second type of particles is first driven to the viewing surface by applying a high electric field of appropriate polarity, and then a low electric field of opposite polarity is applied to cause the third type of particles to lie adjacent the viewing surface while the first, second and fourth types of particles are spaced from this surface. (Note that the second part of this sequence involves a change from the optical characteristic of a high negative particle (the second type of particle) to the optical characteristic of a low positive particle (the third type of particle). Similarly, to display the optical characteristic of the fourth type of particles, the first type of particles is first driven to the viewing surface by applying a high electric field of appropriate polarity, and then a low electric field of opposite polarity is applied to cause the fourth type of particles to lie adjacent the viewing surface while the first, second and third types of particles are spaced from this surface. (Again, note that the second part of this sequence involves a change from the optical characteristic of a high positive particle (the first type of particle) to the optical characteristic of a low negative particle (the fourth type of particle). In practice, to achieve optimum separations of the various types of particles, the waveforms (sequences of drive pulses) may be considerably more complicated than the preceding simple summary would suggest, and may include any one or more of (a) repetitions of the one or two basic drive pulses already described; (b) periods of zero voltage between drive pulses; (c) the use of shaking pulses (rapidly alternating positive and negative pulses) intended to mix the various types of particles uniformly; and (d) direct current (DC) balancing pulses intended to render the overall impulse of the waveform zero or close to zero (it being known that repeated application on DC-imbalanced waveforms to electrophoretic displays may eventually cause damage to the displays which may reduce the quality of the displayed images and may ultimately cause the display to fail completely). As to all the preceding waveform features, see for example the aforementioned U.S. Pat. No. 9,640,119.

Although in most cases it is not stated explicitly, the four particle electrophoretic media in the aforementioned patents use light-scattering ("reflective") particles, not light-transmissive particles, so that the color (or other optical characteristic) seen at the viewing side is determined only by the color of the particles immediately adjacent the front electrode, the relative positions of the other particles being irrelevant. Accordingly, such electrophoretic media display only four independent optical states, although they may also display a "particle mixture" state (typically grayish), in which the various types of particles are mixed at random, and other mixed states in which two types of particles lie adjacent the viewing side; for example, an orange color may be produced by mixing red and yellow particles adjacent the viewing surface.

This limitation of four particle electrophoretic media to four independent optical states is a serious practical disadvantage because in many applications, for example electronic signs such as electronic shelf labels, it is desirable to be able to display black, white and three primary colors, for example red, green and blue or blue, red and yellow. Good black and white states are important for text, while three primary colors allow for full color display by dithering. Hitherto, four particle electrophoretic media have typically either had good black and white with two "highlight" colors (usually red and yellow) or had white and three primary colors, relying upon mixtures of the three primary colors to produce a (frequently unsatisfactory) "process" black.

It is known to overcome the aforementioned disadvantage of four particle electrophoretic media by incorporating a fifth, and optionally a sixth, type of particles into the electrophoretic medium; see, for example, U.S. Pat. Nos. 9,541,814 and 9,922,603. However, increasing the number of types of particles in the electrophoretic medium renders it more difficult to choose appropriate particles because of the increased need for tight control over the charges on the various particles, the increased possibilities for interactions between the various particles (which may result in increased color contamination), and lengthened waveforms; the five and six particle electrophoretic media described in U.S. Pat. Nos. 9,541,814 and 9,922,603 require at least one three-step waveform; to display the color of an intermediate charged particle of one polarity, it is first necessary to display the color of the highly charged particle of the one polarity, then the color of the low charged particle of the opposite polarity and finally the color of the intermediate charged particles of the one polarity.

The aforementioned application Ser. No. 17/339,216 describes a four particle electrophoretic medium generally similar to those described in the aforementioned patents but in which one of the particles is white, one of the non-white particles is partially light-transmissive, and the other two non-white particles are light-reflective. Preferably, one pair of particles of the same polarity comprise blue and red particles with one of these particles being light-transmissive and the other light-reflective, with the visible spectra of the red and blue particles being chosen such that a mixture of the two types of particles adjacent the front electrode produces a good process black. One embodiment of this four particle system illustrated in FIGS. 3A-3F has a light-transmissive blue particle and enables the display of black, white, red, blue and yellow colors; an orange color can also be displayed. However, in order to display a good full color image, it is also necessary for such a black/white/blue/red/yellow system to be capable of displaying a green state, since in practice dithering a black/white/blue/red/yellow system does not provide a good saturated green. Although the system of FIGS. 3A-3F of application Ser. No. 17/339,216 contains both blue and yellow particles, and hence should be capable of displaying green by mixing the blue and yellow particles adjacent the viewing surface of the display, or disposing the blue particles adjacent the viewing surface with the yellow particles immediately below them, the application does not describe any method of producing such a green state.

(application Ser. No. 17/339,216 also describes a second embodiment of a four particle system, illustrated in FIGS. 6A-6F, which has a light-transmissive red particle and a reflective blue particle, and this second embodiment is capable of displaying a green color. However, for practical reasons, such as the availability of appropriate pigments, it may be preferred to use a system having a light-transmissive blue particle rather than a red one.)

Accordingly, there is a need for a method of driving a display such as that shown in the aforementioned FIGS. 3A-3F to produce a green color, and the present invention provides such a method.

SUMMARY OF INVENTION

This invention provides a method for driving an electrophoretic display comprising a layer of an electrophoretic medium having a viewing surface on one side thereof, and a second surface on the opposed side thereof, the electrophoretic display further comprising voltage control means for applying an electric field through the layer of electrophoretic medium, the electrophoretic medium comprising a fluid and first, second, third and fourth types of particles dispersed in the fluid, the first, second, third and fourth types of particles having respectively first, second, third and fourth colors differing from one another, the first and third types of particles having charges of one polarity and the second and fourth types of particles having charges of the opposite polarity, the first type of particles having a greater zeta potential or electrophoretic mobility than the third type of particles, and the second type of particles having a greater zeta potential or electrophoretic mobility than the fourth type of particles, wherein one of the types of particles is white, one of the types of non-white particles is partially light-transmissive, and the remaining two types of non-white particles are light-reflective. The driving method of the invention comprises:

(i) driving the electrophoretic medium to display the second color at the viewing surface;

(ii) after step (i), applying a first driving voltage for a first period of time, the first driving voltage having a polarity driving the second and fourth particles towards the viewing surface;

(iii) after step (ii), applying a second driving voltage for a second period of time, the second driving voltage having a polarity opposite to, and a magnitude less than, the first driving voltage and the second period being less than the first period; and (iv) repeating steps (ii) and (iii), thereby causing the color of a mixture of the first and second types of particles to be displayed at the viewing surface.

In this driving method, a period of zero voltage may be inserted between each step (ii) and the subsequent step (iii) and/or between each step (iii) and the subsequent step (ii).

Step (i) of the driving method of the invention may be effected by:

a) applying a third driving voltage for a third period of time, the third driving voltage having the same polarity and substantially the same magnitude as the first driving voltage, but the third period of time being less than the first period of time;

b) after step a), applying a fourth driving voltage for a fourth period of time, the fourth driving voltage having the same polarity, and a magnitude less than, the second driving voltage, and the fourth period of time being greater than the third period of time; and c) repeating steps a) and b).

This preferred step (i) may be carried out starting from a mixed state, in which all four types of particles are randomly distributed. A period of zero voltage may be inserted between each step a) and the subsequent step b). A period of zero voltage may also be inserted between the last repetition of step b) and the first occurrence of step (ii).

The driving method of the invention may be preceded by one or more periods of shaking waveform and/or one or more periods of DC balancing waveform (i.e., periods in which a non-zero voltage is applied to the display so as to reduce or eliminate the overall impulse of the total waveform applied).

In any of the driving methods of the invention, when a sequence of drive pulses is repeated, that repetition may be for at least 4 times.

In some embodiments of the present invention, the white type of particles are the third or fourth type of particles, i.e., are one of the low charged types of particles. Also, where the white particles are one of the low charged types of particles, the partially light-transmissive type of particles may be the highly charged type of particles of the opposite polarity to the white particles. In this case, it is advantageous for the light-reflective type of particle bearing the same charge as the partially light-transmissive type of particle to have optical characteristics such that a mixture of the two types of particles absorbs substantially all visible radiation, i.e., provides a process black.

In the electrophoretic medium of the invention, the fourth particle may be white, the second particle may be yellow in color, and the first particle may be blue and light-transmissive; it may be advantageous for the second particles to be red in order.

The four particle electrophoretic medium of the invention can thus display six colors (not counting the fully mixed state in which all four types of particles are randomly mixed). The colors of the white particles and the two light-reflective types of particles can be displayed simply by bringing each type of particles adjacent the viewing surface. The three other colors are displayed by forming binary mixtures of the partially light-transmissive type of particles (typically blue) with each of the other three types of particles adjacent the viewing surface. A mixture of the light-transmissive particles and the white particles causes light entering through the viewing surface to undergo scattering by the white particles and passage through the partially light-transmissive particles, eventually re-emerging from the viewing surface with the color of the light-transmissive type of particles, typically blue. (See the discussion below with reference to FIG. 3E regarding the practical details of this color formation.) The fifth color displayed is a process black, which is displayed by bringing the light-transmissive particles adjacent the viewing surface, with the reflective particles bearing charges of the same polarity immediately behind (i.e., immediately on the opposed side of the light-transmissive particles from the viewing surface) so that light entering through the viewing surface passes through the light-transmissive type of particles, and is then essentially totally absorbed by the reflective type of particles immediately behind the light-transmissive particles. Obviously, for this process black to be satisfactory, it is necessary that the combined absorption by the two types of particles extend across the whole visible spectrum, which is why it is preferred that the two types of particles be red and blue, since it is relatively easy to arrange that red and blue particles together absorb substantially all visible light. An example of absorption spectra for red and blue pigments capable of producing an excellent process black is given below. The sixth color is produced by bringing a mixture of the light-transmissive particles and the other light-reflective particle adjacent the viewing surface; typically, as already described, this is a mixture of blue and yellow to produce a green state. Some media can display a seventh state by bringing a mixture of the two non-white light-reflective types of particles adjacent the viewing surface; when these two types of particles are yellow and red, this produces an orange color.

As already indicated, in the electrophoretic media used in the driving method of the invention, one type of particles is white, another type is partially light-transmissive, while the remaining two or three types of particles are light-reflective (i.e., light scattering). In practice, of course, there no such thing as a completely light-scattering particle or a completely non-light-scattering, light-transmissive particle, and the minimum degree of light scattering of the light-scattering particles, and the maximum tolerable degree of light scattering tolerable in the light-transmissive particles, may vary somewhat depending upon factors such as the exact pigments used, their refractive index and size, their colors, the thickness of the particle layer in question (which is itself dependent upon the thickness of the electrophoretic medium layer and the loading of each type of particle in that medium) and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment.

The light-transmissivity of pigments is most conveniently measured by contrast ratio, which (for purposes of the present application) is defined as the ratio of luminous reflectance of a specimen backed with black material of a specified reflectance (Rb) to reflectance of the same specimen backed with white material of specified reflectance (Rw):

$$CR=Rb/Rw$$

Contrast ratio (CR) is an indicator of opacity, and will of course vary with the thickness of the layer of pigment present in the electrophoretic medium as well as the type of pigment used. Generally at CR=0.98, you get full opacity. The hiding power of paint is understood to be its ability to eliminate the contrast between a black and a white substrate to the extent that the reflectance obtained over a black substrate is 98% of that obtained over a white substrate. The layer of light-transmissive pigment used in the present electrophoretic medium should have a contrast ratio of not more than about 0.5, and preferably not more than 0.3. The blue pigment used in the experiments described below has a contrast ratio of about 0.2 The reflective pigments should have contrast ratios not less than about 0.6, and preferably not less than about 0.7.

The electrophoretic medium used in the invention may be encapsulated or unencapsulated. If encapsulated, the electrophoretic medium may be contained within a plurality of microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. Alternatively, the electrophoretic medium may be encapsulated in capsules, or may be in the form of a so-called polymer-dispersed electrophoretic medium comprising a plurality of discrete droplets of the electrophoretic fluid and a continuous phase of a polymeric material; the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760.

DETAILED DESCRIPTION

As indicated above, the present invention provides a method for driving a four particle electrophoretic medium to display at least six separate optical states. The electrophoretic medium comprises a fluid and first, second, third and fourth types of particles dispersed in the fluid; all four types of particles have different colors. The first and third types of particles bear charges of one polarity and the second and fourth types of particles bear charges of the opposite polarity. The first type of particles have a greater zeta potential or electrophoretic mobility than the third type of particles, and the second type of particles have a greater zeta potential or electrophoretic mobility than the fourth type of particles. (Thus, in the two pairs of oppositely charged particles, one pair carries a stronger charge than the other pair. Therefore, the four types of particles may also be referred to as high positive particles, high negative particles, low positive particles and low negative particles.) One type of particles is white. One of the non-white types of particles is partially light-transmissive, while the remaining two types of non-white particles are light-reflective.

Figure 1:
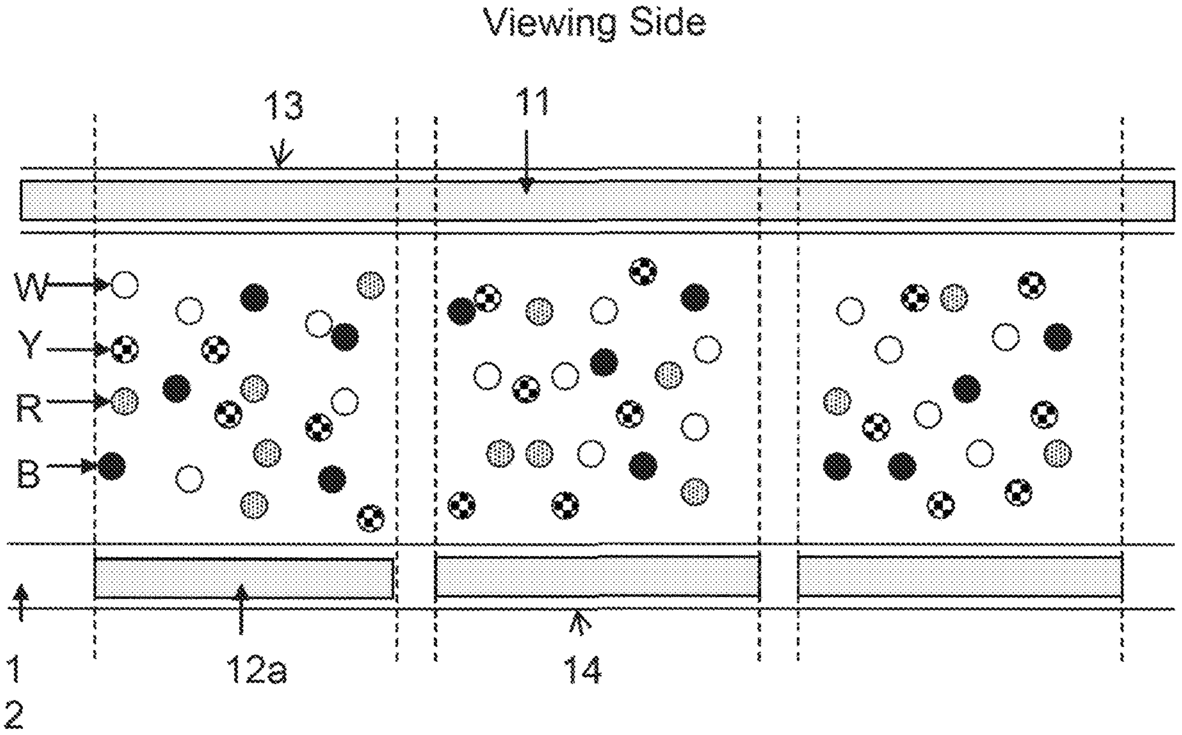
FIG. 1 of the accompanying drawings is a schematic cross-section through a four particle display device which can be driven by the method of the present invention.

As an example shown in FIG. 1, the blue particles (B) and yellow particles (Y) are the first pair of oppositely charged particles, and in this pair, the blue particles are the high positive particles and the yellow particles are the high negative particles. The red particles (R) and the white particles (W) are the second pair of oppositely charged particles, and in this pair, the red particles are the low positive particles and the white particles are the low negative particles. It will be appreciated that the aforementioned charges could be reversed in polarity and the display would continue to function in the same manner, except of course that the polarity of the driving waveforms described below would need to be reversed.

The white particles may be formed from an inorganic pigment, such as $TiO_2$, $ZrO_2$, ZnO, $Al_2O_3$, $Sb_2O_3$, $BaSO_4$, $PbSO_4$ or the like.

Particles of non-white and non-black colors are independently of a color, such as, red, green, blue, magenta, cyan or yellow. The pigments for color particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, “New Pigment Application Technology” (CMC Publishing Co, Ltd, 1986) and “Printing Ink Technology” (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. A preferred partially light-transmitting blue pigment for use in the display of FIG. 1 is Kremer 45030, “Ultramarine Blue, greenish extra”, a sodium aluminum sulfosilicate pigment, C.I. Pigment Blue 29:77007 available from Kremer Pigmente GmbH & Co. KG, Hauptstr. 41-47, DE-88317 Aichstetten, Germany. This light-transmitting blue pigment may usefully be used in combination with the aforementioned Hostaperm Red D3G 70 pigment.

Figure 2:
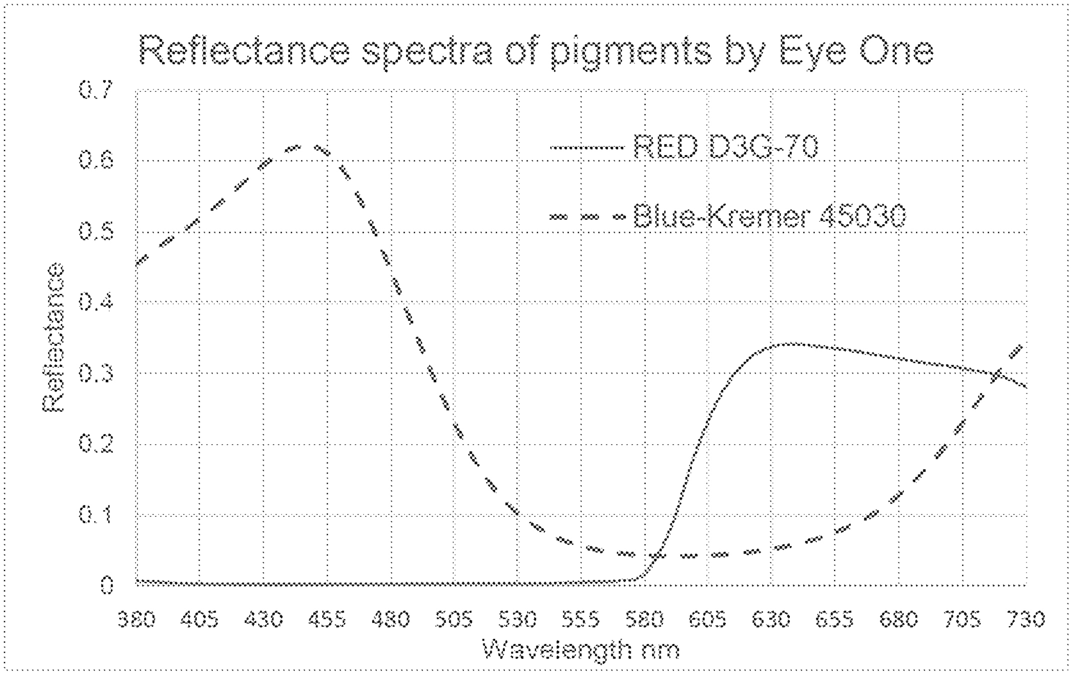
FIG. 2 shows absorption spectra of preferred pigment particles for use in the display device of FIG. 1.
Figure 3A:
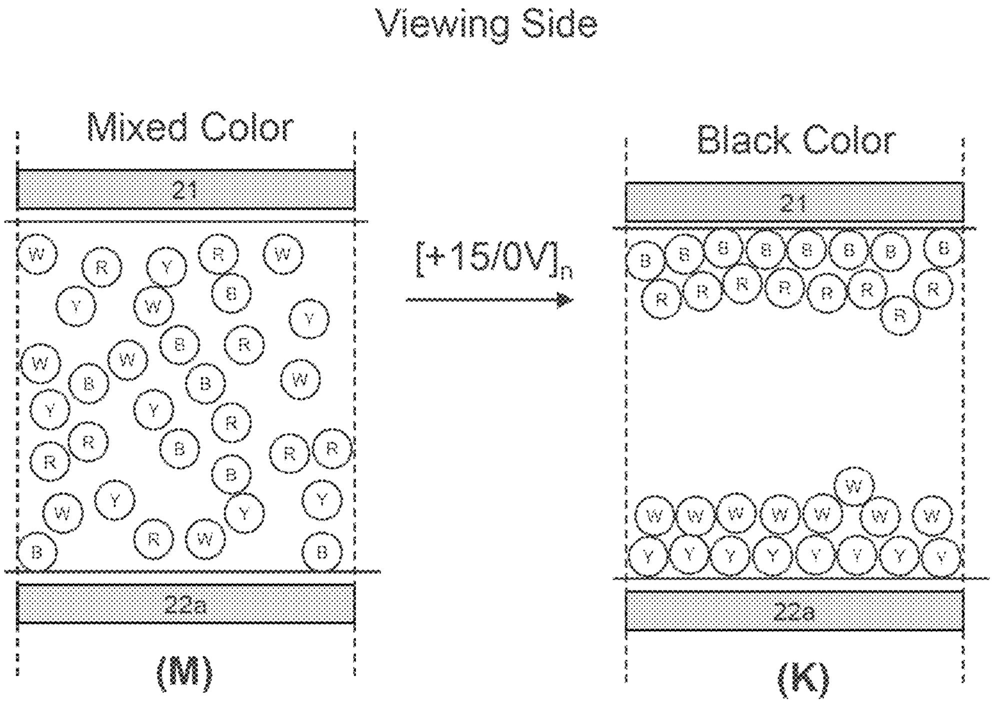
FIGS. 3A-3G are schematic cross-sections similar to that of FIG. 1 but showing various optical transitions which the display device of FIG. 1 can undergo.

As illustrated in FIG. 2, this blue pigment has peak transmission at about 450 nm and substantial transmission in the visible over the range of 400 to about 530 nm. The Hostaperm Red D3G 70 pigment, on the other hand, is essentially non-reflective below about 555 nm. Accordingly, when the two pigments are arranged as shown in FIG. 3A, with the light-transmissive blue pigment adjacent a viewing surface and the reflective red pigment immediately on the opposed side of the blue pigment from the viewing surface, all visible radiation which enters through the viewing surface and passes through the blue pigment will be absorbed by the red pigment and the viewing surface will appear black.

The non-white particles may also be inorganic pigments, such as red, green, blue and yellow. Examples may include, but are not limited to, CI pigment blue 28, CI pigment green 50 and CI pigment yellow 227.

In addition to the colors, the four types of particles may have other distinct optical characteristics, such as optical transmission, reflectance, and luminescence or, in the case of displays intended for machine reading, pseudo-color in the sense of a change in reflectance of electromagnetic wavelengths outside the visible range.

A display layer utilizing the display fluid of the present invention has, as shown in FIG. 1, two surfaces, a first surface (13) on the viewing side and a second surface (14) on the opposite side from the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12*a*). However, the invention is not restricted to any particular electrode configuration.

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode (12*a*). An electric field is created for a pixel by the potential difference between a voltage applied to the common electrode and a voltage applied to the corresponding pixel electrode. (Note that in the various waveforms illustrated in the accompanying drawings, the potential differences plotted are those applied the pixel electrode 12*a*, the common electrode being assumed to be, as is usually the case, held at ground voltage. Since the color displayed by the pixel is dependent upon the particles adjacent the common electrode 11, when a positive potential difference is shown in the drawings, the common electrode is negative relative to the pixel electrode and positively charged particles are drawn to the common electrode.)

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoroethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN # Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 19K, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow-through cell for determination of the zeta potential.

The amplitudes of the "high positive" particles and the "high negative" particles may be the same or different. Likewise, the amplitudes of the "low positive" particles and the "low negative" particles may be the same or different. However, the zeta potential of the "high positive" or positive particle with greater charge intensity or greater charge magnitude is larger than the zeta potential of the "low positive" or positive particle with lesser charge intensity or lesser charge magnitude, and the same logic follows for the high negative and low negative particles. In the same medium under the same field a higher charged particle will have a greater electrophoretic mobility, that is, the higher charged particle will traverse the same distance in less time than the lower charged particle.

It is also noted that in the same fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

The following Example illustrates a display device utilizing such a display fluid.

EXAMPLE

This example is demonstrated in FIGS. 3A-3G. The high positive light-transmitting particles are of a blue color (B); the high negative particles are of a yellow color (Y); the low positive particles are of a red color (R); and the low negative particles are of a white color (W). The transition shown in FIG. 3A starts from a completely mixed state, denoted "(M)", produced by applying shaking pulses as described below. When alternating pulses of a high positive potential difference (e.g., +15V) and no potential difference (0 V) are applied to the pixel electrode **22*a* for a time period of sufficient length, the blue (B) and red (R) particles are driven towards the common electrode (21) or viewing side, and the yellow and white particles are driven towards the pixel electrode 22*a* side. The red (R) and white (W) particles, because they carry weaker charges, move slower than the highly charged blue and yellow particles. As a result, the blue particles lie immediately adjacent the common electrode, with the red particles immediately below them (as illustrated in FIG. 3A). For reasons already discussed above, this causes the pixel to appear black, denoted "(K)" in FIG. 3A**; the white and yellow particles are masked by the reflecting red particles and do not affect the displayed color.

Similarly, the transition shown in FIG. 3B starts from the completely mixed state (M), produced by applying shaking pulses as described below. When alternating pulses of a high negative potential difference (e.g., −15 V) and no voltage (0 V) are applied to the pixel electrode **22*a* for a time period of sufficient length, the blue (B) and red (R) particles are driven towards the pixel electrode 22*a* side, and the yellow and white particles to be driven towards the common electrode side. The red (R) and white (W) particles, because they carry weaker charges, move slower than the highly charged blue and yellow particles. As a result, the reflective yellow particles lie immediately adjacent the common electrode, thus causing the pixel to appear yellow, denoted "(Y)" in FIG. 3B; the white, red and blue particles are all masked by the reflecting yellow particles and do not affect the displayed color. Although in principle the yellow color can be produced by alternating pulses of −15V and 0 V, in practice a more complicated waveform is preferred, as described below with reference to FIG. 5B**.

Figure 3B:
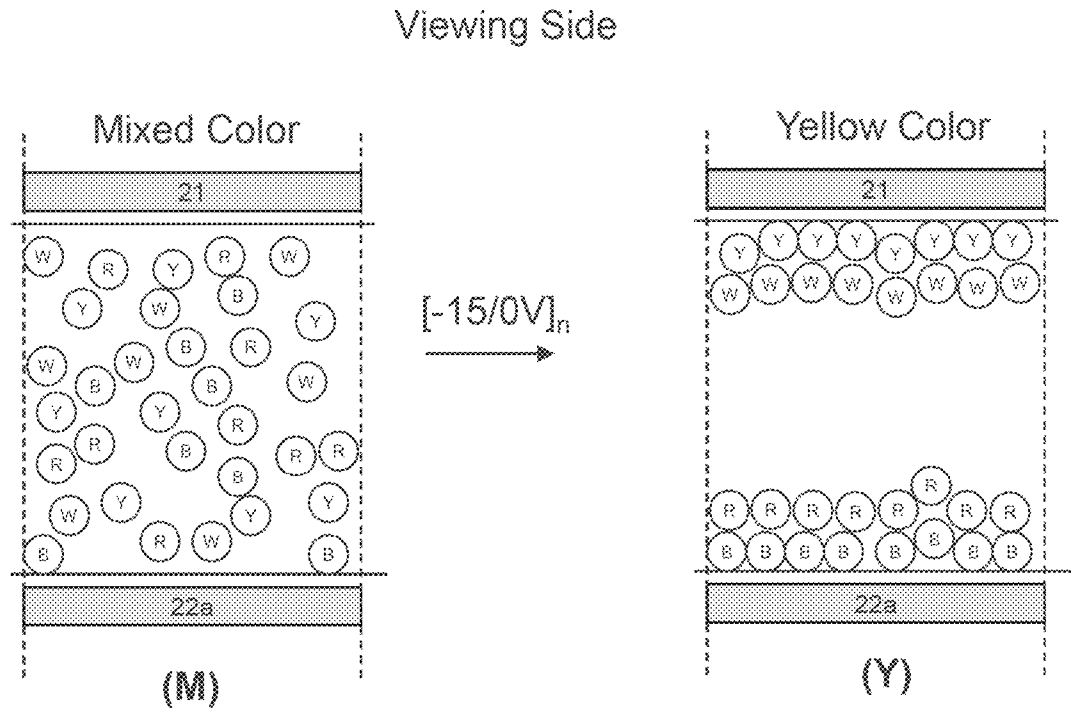
Figure 3C:
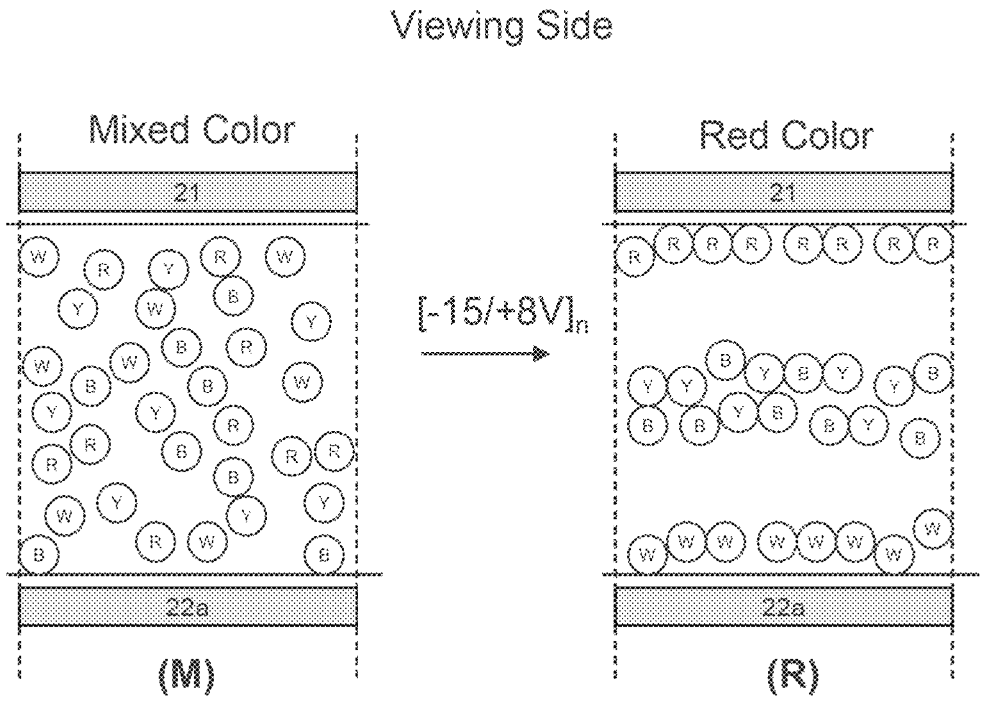

The transition shown in FIG. 3C starts from the completely mixed state (M). When alternating pulses of a high negative potential difference (e.g., −15 V) and a low positive potential difference (e.g., +8 V), with the low positive pulses being much longer than the high negative pulses, are applied to the pixel electrode **22*a* for a time period of sufficient length, the red (R) particles are driven towards the common electrode 21 side, and the white particles (W) are driven towards the pixel electrode 22*a* side. The effect of the oscillating electric field is to cause the highly charged blue and yellow particles to pass each other repeatedly in the middle of the thickness of the electrophoretic layer, and the strong electrical attraction between the highly charged positive and negative particles greatly slows the movement of these particles and tends to keep them in the middle of the thickness of the electrophoretic layer. However, the electric field generated by the low positive pulses is sufficient to separate the low charged white and red particles, thereby allowing the low positive red particles (R) to move all the way to the common electrode 21 side and the low negative white particles to move to the pixel electrode 22*a* side. As a result, the reflective red particles lie immediately adjacent the common electrode, thus causing the pixel to appear red, denoted "(R)" in FIG. 3C**; the white, yellow and blue particles are all masked by the reflecting red particles and do not affect the displayed color. Importantly, this system allows weaker charged particles to be separated from the stronger charged particles of the opposite polarity.

Figure 3D:
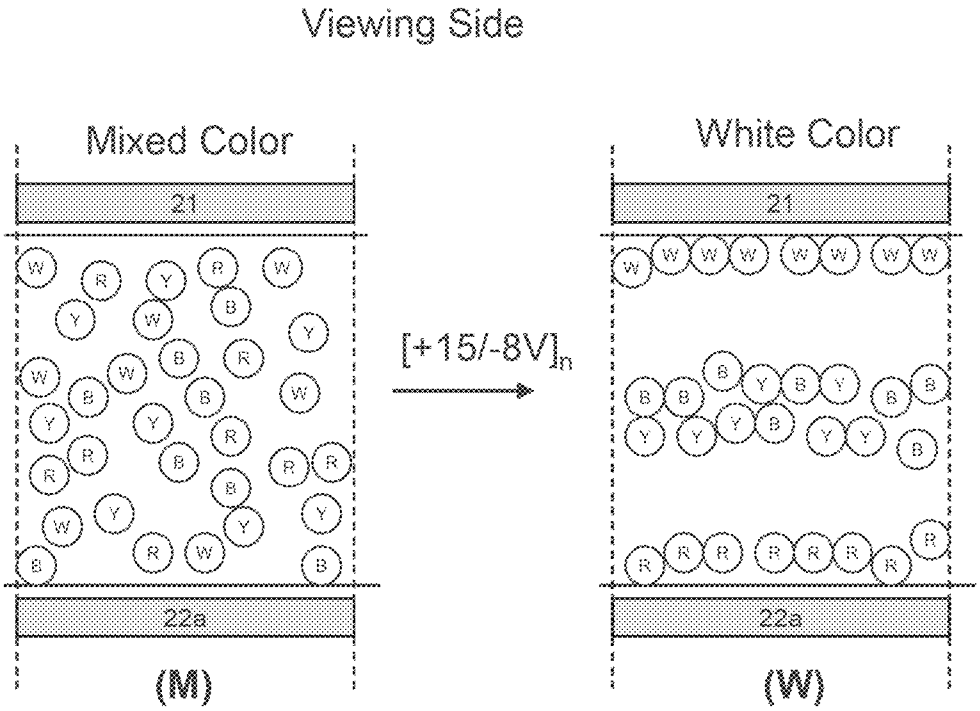

The transition shown in FIG. 3D starts from the completely mixed state (M). When alternating pulses of a high positive potential difference (e.g., +15 V) and a low negative potential difference (e.g., −8 V), with the low negative pulses being much longer than the high positive pulses, are applied to the pixel electrode **22*a* for a time period of sufficient length, the red (R) particles are driven towards the pixel electrode 22***a* side, and the white particles (W) are driven towards the common electrode 21 side. As in the transition shown in FIG. 3C, the effect of the oscillating electric field is to cause the highly charged blue and yellow particles to remain together in the middle of the thickness of the electrophoretic layer. However, the electric field generated by the low negative pulses is sufficient to separate the low charged white and red particles, thereby allowing the low positive red particles (R) to move all the way to the pixel electrode 22*a* side and the low negative white particles to move to the common electrode 21 side. As a result, the white particles lie immediately adjacent the common electrode, thus causing the pixel to appear white, denoted "(W)" in FIG. 3D; the red, yellow and blue particles are all masked by the white particles and do not affect the displayed color. Although in principle the white color can be produced by alternating pulses of +15 V and −8 V, in practice a more complicated waveform is preferred, as described below with reference to FIG. 5D.

Figure 3E:
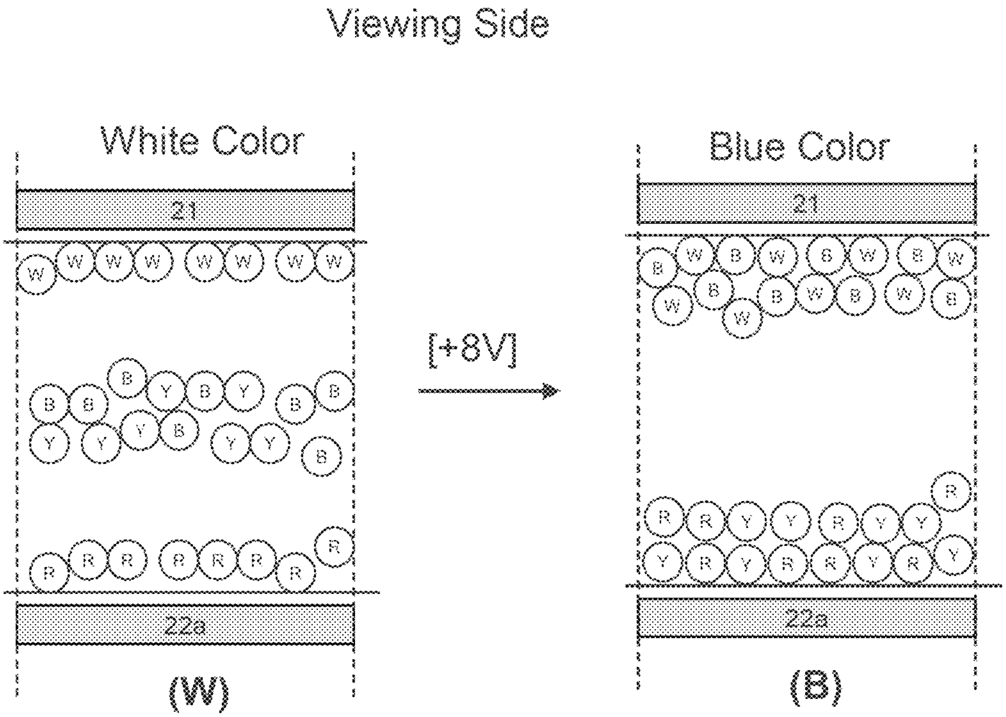

The transition shown in FIG. 3E starts from the white state (W) shown in FIG. 3D. To the device in this state is applied a positive potential difference pulse the overall impulse of which is not sufficient to drive the device to the black state (K) shown in FIG. 3A. The positive pulse causes the highly charged blue particles to move towards the common electrode 21 side and the white particles to move towards the pixel electrode 22*a* side. However, since the highly charged blue particles move more quickly than the low charged white particles, a mixture of the blue particles and the white particles is visible through the viewing surface, so that the pixel appears blue.

It might at first appear from FIG. 3E that the saturation of the blue color seen at the viewing surface would be substantially reduced because of reflection from white pigment disposed immediately adjacent the front electrode. However, it should be understood that FIG. 3E (and also FIGS. 3A-3D and 3F-3G) are all highly schematic. In practice pigment particles are not spherical (because the crystalline pigments used fracture preferentially along certain crystal planes—for example, rutile titania, commonly used as the white pigment in electrophoretic media, is tetragonal and tends to form square prisms), the particles vary considerably in size, the "reflection" from the white particles is essentially Lambertian light-scattering rather than specular reflection, and several more layers of particles are present than are illustrated in FIG. 3E. (The exact number of layers depends of course upon the particle loading in the electrophoretic medium, the thickness of this medium and the sizes of the individual particles, but in practice at least 5-10 layers are normally present.) The overall effect of all the foregoing factors is that only a very small proportion of the visible light entering the electrophoretic medium through the viewing surface is reflected directly back through the viewing surface by the white particles, and in practice a well saturated blue can be achieved.

Also, although FIG. 3A shows the blue and red particles in completely separate layers, whereas FIG. 3E shows a complete admixture of the blue and white particles, it will be appreciated that these represent two extreme states, and in practice there can be a continuous graduation between completely separate layers and complete admixture. Provided that the requisite colors are obtained, the present invention is not limited to any theoretical explanation regarding the exact positions of the particles and their degree of admixture with other particles.

Figure 3F:
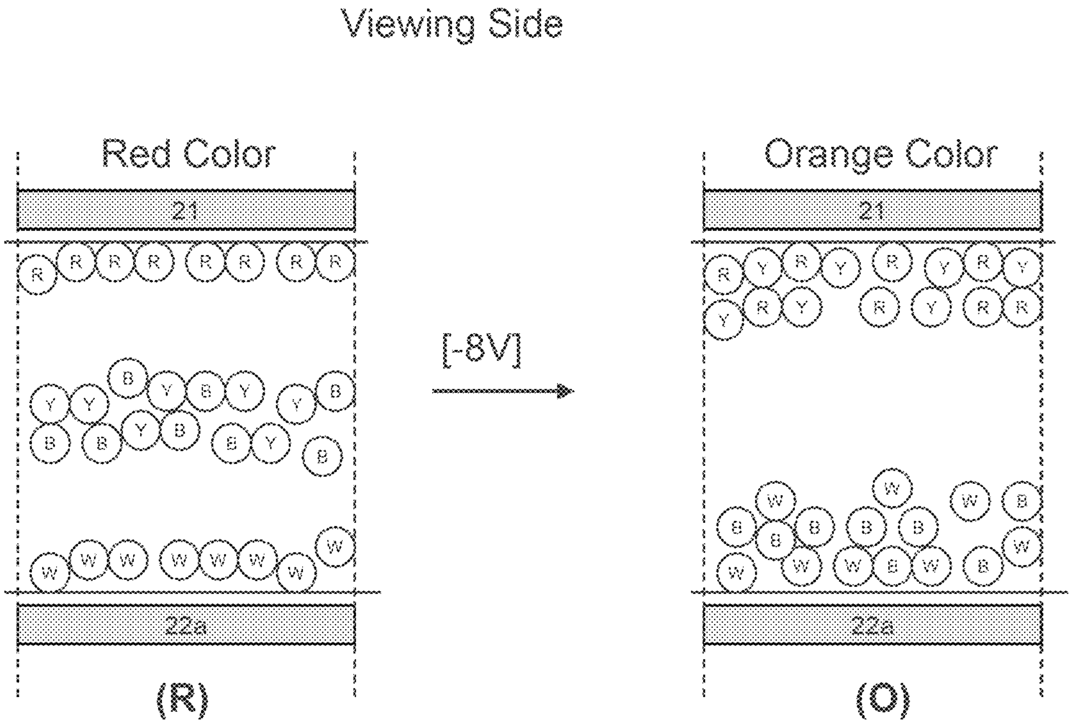

The transition shown in FIG. 3F starts from the red state (R) shown in FIG. 3C. To the device in this state is applied a negative potential difference pulse the overall impulse of which is not sufficient to drive the device to the yellow state (Y) shown in FIG. 3B. The negative pulse causes the highly negative yellow particles to move towards the common electrode (21) side, while the low positive red particles move much more slowly towards the pixel electrode (22*a*) side. The result is that a mixture of the red and yellow particles is visible through the common electrode 21 and the pixel appears orange.

Figure 3G:
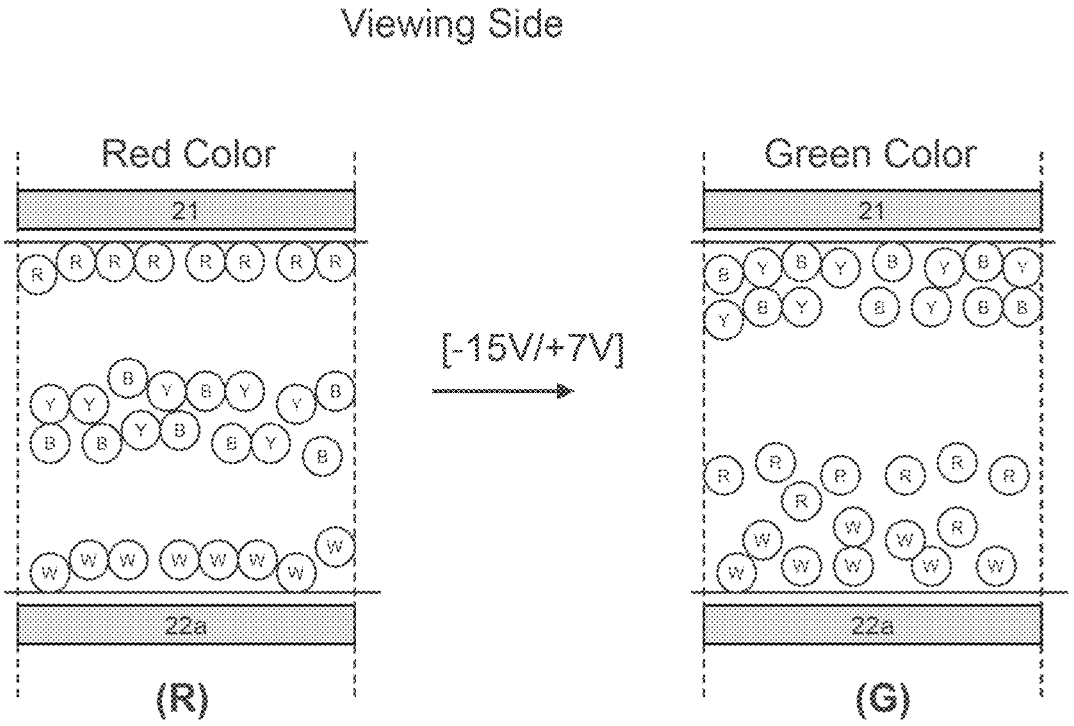

The transition shown in FIG. 3G also starts from the red state (R) shown in FIG. 3C. To the device in this state is applied a high negative potential difference pulse, which drives the device from the red state shown in FIG. 3C towards the yellow state, with the yellow and white particles moving upwardly and the blue and red particles moving downwardly (as illustrated). The high negative pulse is followed by an intermediate positive potential difference pulse which reverses the aforementioned motions of the particles. The high negative and intermediate positive pulses are then repeated. Because the blue and yellow particles are aggregated in the red state from which the transition starts, although the impulses of the high negative and intermediate positive pulses are not balanced, the tendency of the highly charged yellow and blue particles to aggregate when less than a high potential difference is applied, causes the aggregate to be substantially maintained, so that the overall effect of the alternating negative and positive pulses is to cause the blue/yellow aggregate to move towards the common electrode (21) side, while the red particles move in the opposed direction and eventually pass through the blue/yellow aggregate. The final result, as shown in FIG. 3G is that the blue/yellow aggregate lies adjacent the common electrode (21), resulting in the display of a green color, with the red and white particles masked by the blue/yellow aggregate. (The positions of the red and white particles in FIG. 3G are largely arbitrary, but since both types of particles are masked, their exact positions have no effect on the visible color of the pixel.)

In order to ensure both color brightness and color purity, prior to any of the transitions discussed above a DC balancing and/or shaking waveform may be used. The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec. In practice, there may be at least 10 repetitions (i.e., ten pairs of positive and negative pulses) in a shaking pulse. The shaking waveform may be applied regardless of the optical state (black, white, red or yellow) before a driving voltage is applied. After the shaking waveform is applied, the optical state would not be a pure white, pure black, pure yellow or pure red. Instead, the color state would be from a mixture of the four types of pigment particles.

Each of the driving pulses in the shaking waveform is applied for not exceeding 50% (or not exceeding 30%, 10% or 5%) of the driving time required from the full transition from the color of one highly charged particle to the color of the other highly charged particle (blue to yellow, or vice versa, in this example). For example, if it takes 300 msec to drive a display device from a full black state to a full yellow state, or vice versa, the shaking waveform may consist of positive and negative pulses, each applied for not more than 150 msec. In practice, it is preferred that the pulses are shorter. The shaking waveform as described may be used in the driving methods of the present invention. In all the drawings throughout this application, the shaking waveform is abbreviated (i.e., the number of pulses is fewer than the actual number).

A DC balancing waveform is designed to reduce the overall impulse (i.e., the integral of the voltage with respect to time) of the overall waveform to a small value, and if possible zero. As discussed for example in U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A waveform, which does result in zero net time-averaged applied electric field across the electro-optic medium, is conveniently referred to a "direct current balanced" or "DC balanced" waveform.

Figure 4:
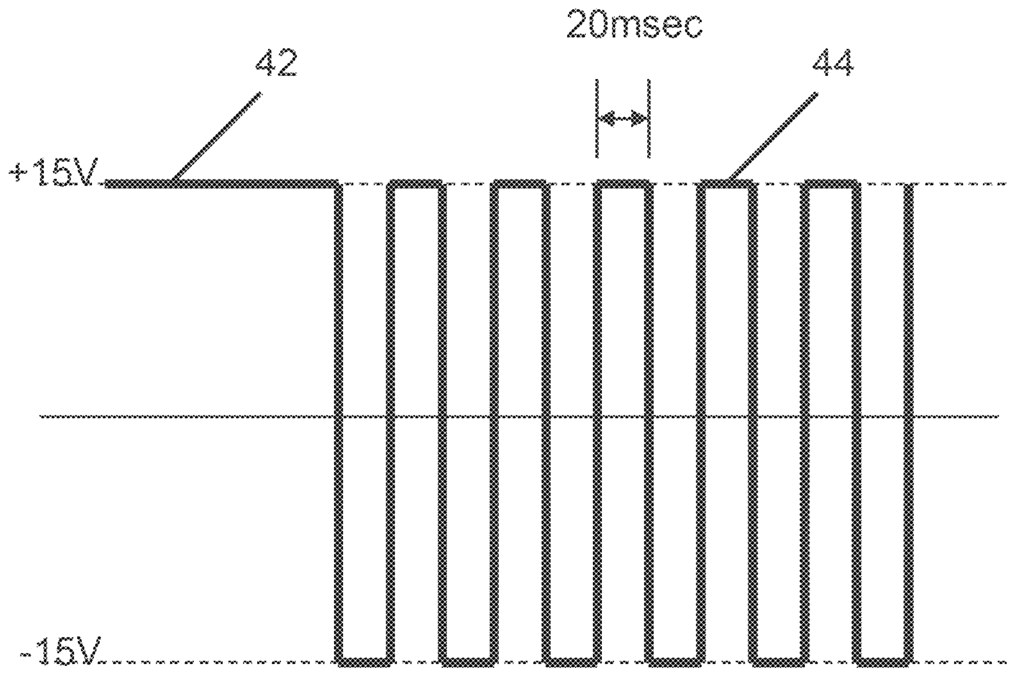
FIG. 4 illustrates a DC balancing waveform and a shaking waveform, which can be incorporated into the driving methods of the present invention.

FIG. 4 illustrates a combined DC balancing/shaking waveform comprising a DC balancing section 42 followed by a shaking section 44. Although FIG. 4 illustrates the DC balancing section 42 as having a high positive potential difference, it will be appreciated that the DC balancing section may have a high or low, positive or negative potential difference, or a zero potential difference, depending upon the impulse of the remainder of the applied waveform.

Furthermore, although FIG. 4 illustrates a single DC balancing section followed by a single shaking section, a combined DC balancing/shaking waveform may contain multiple DC balancing sections and multiple shaking sections alternating with one another, and may begin and end with either a DC balancing section or a shaking section. The use of multiple DC balancing sections may be advantageous in that, by (say) setting one or more DC balancing sections to a high voltage and one or more to zero, it may be possible to achieve a closer approach to zero overall waveform impulse than with a single DC balancing section. Multiple DC balancing sections may vary from each other in both duration and applied potential difference. Similarly, multiple shaking sections may differ from each other in duration, magnitude of potential difference and frequency.

Figure 5A:
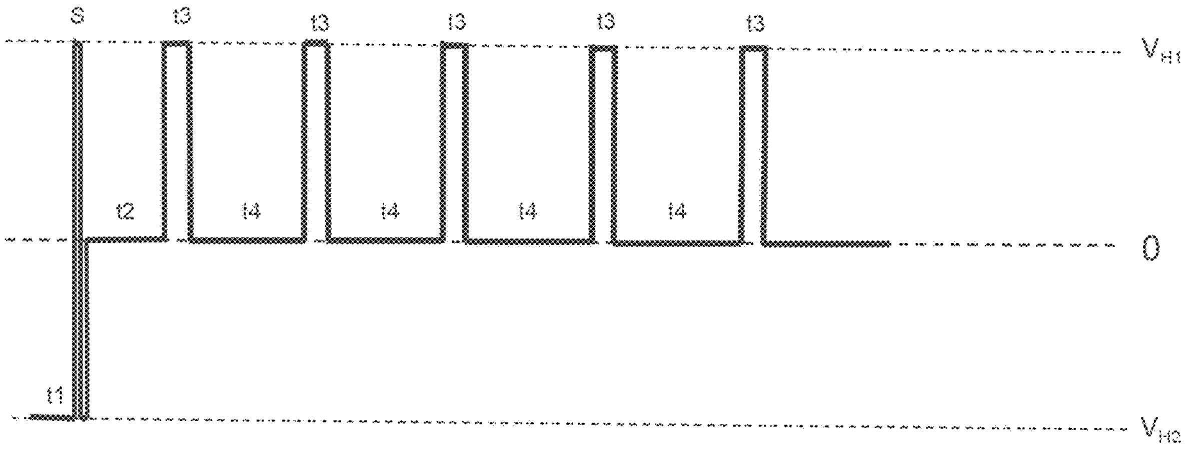
FIGS. 5A-5G shown waveforms that may be used to carry out the transitions shown in FIGS. 3A-3G respectively.

FIG. 5A illustrates the waveform used to effect the transition of FIG. 3A to produce a black optical state. After a DC balancing section of duration t1 at a high negative voltage VH2, and a shaking section S, to achieve the mixed state M (the duration of both t1 and the shaking section S are greatly reduced in FIG. 5A, and multiple DC balancing and shaking sections may of course be used), there is applied to the pixel electrode (i) a period of zero voltage of duration t2; (ii) a period of high positive driving voltage VH1 of duration t3; (iii) a period of zero voltage of duration t4 substantially greater than t3; and (iv) several repetitions of (ii) and (iii), typically 4-8 repetitions.

Figure 5B:
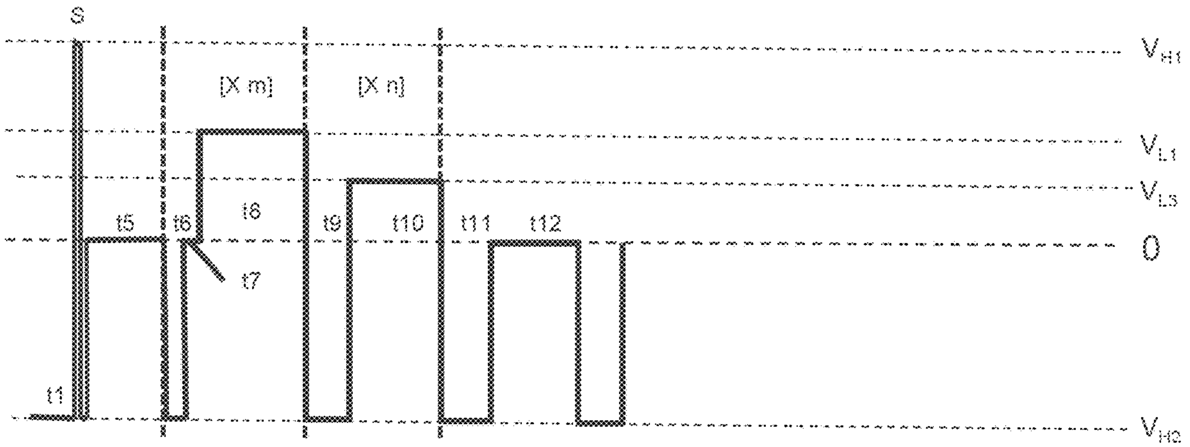

FIG. 5B illustrates the waveform used to effect the transition of FIG. 3B to produce a yellow optical state (i.e., the color of the second particle). As already indicated, in principle a yellow color can be produced by applying alternating pulses of a high negative potential difference (e.g., −15 V) and no voltage (0 V) the pixel electrode 22*a* for a time period of sufficient length. However, to ensure a pure yellow color a much more complicated waveform is preferred, as shown in FIG. 5B. After a DC balancing section of duration t1 and a shaking section S essentially identical to those already described with reference to FIG. 5A, the waveform of FIG. 5B comprises a period of zero voltage of duration t5, followed by (i) a short period of duration t6 of a high negative potential difference VH2; (ii) a period of zero voltage of duration t7; and (iii) a period of a low positive potential difference VL1 for a period t8 longer than t6. Typically, the magnitude of VL1 is about half that of VH2, t7 is comparable in length to t6 and t8 is about ten times as large as t6. For example, each of t6 and t7 may be 50 msec, while t8 may be 500 msec. Steps (i), (ii) and (iii) are then repeated several times, as indicated by "[X m]" in FIG. 5B; typically, these steps may be repeated 4-6 times. Following these repetitions, (iv) the high negative potential difference VH2 is applied for a period t9 longer than t6, and then (v) a low positive potential difference VL3, lower than VL1 and typically about one-third of VH1, is applied for a period t10 shorter than t8. Steps (iv) and (v) are then repeated, as indicated by "[X n]" in FIG. 5B; typically, these steps may be repeated 2-3 times. The final portion of the waveform of FIG. 5B comprises the application of the high negative potential difference VH2 for a period t11 longer than t9, a period of zero voltage of duration t12 and a second application of the high negative potential difference VH2 for a period t11. As will readily be apparent, the number of applications of VH2 and the durations t11 in this portion of the waveform can be adjusted empirically.

Figure 5C:
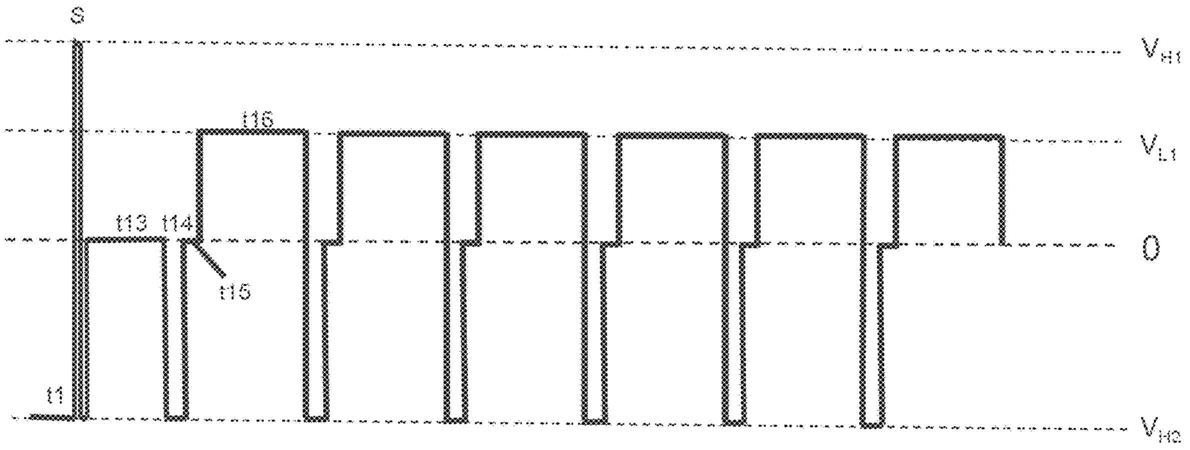

FIG. 5C illustrates the waveform used to effect the transition of FIG. 3C to produce a red optical state (i.e., the color of the second particle). The waveform shown in FIG. 5C closely resembles the first portion of the waveform shown in FIG. 5B; after a DC balancing section of duration t1 and a shaking section S essentially identical to those already described with reference to FIG. 5A, the waveform of FIG. 5C comprises a period of zero voltage of duration t13, followed by (i) a short period of duration t14 of a high negative potential difference VH2; (ii) a period of zero voltage of duration t15; and a period of a low positive potential difference VL1 for a period t16 longer than t14. Typically, the magnitude of VL1 is about half that of VH2, t15 is comparable in length to t14 and t16 is about ten times as large as t14. For example, each of t6 and t7 may be 50 msec, while t8 may be 500 msec. Steps (i), (ii) and (iii) are then repeated several times, as shown in FIG. 5C; typically, these steps may be repeated 6-10 times. The waveform terminates by transitioning from the final application of VL1 to 0 V to ensure a good red color. As will readily be apparent, the number of applications of VH2 and VL1 and the durations t14 and t16 in this waveform can be adjusted empirically.

Figure 5D:
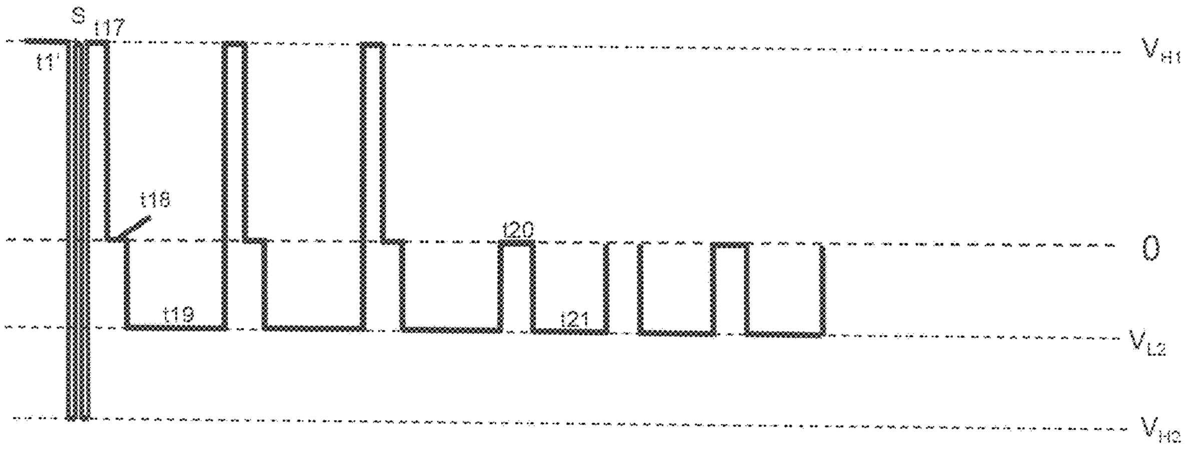

FIG. 5D illustrates the waveform used to effect the transition of FIG. 3D to produce a white optical state (i.e., the color of the fourth particle). Not surprisingly, the first part of the waveform shown in FIG. 5D closely resembles the "red" waveform shown in FIG. 5C but with a change in polarity; after a DC balancing section of duration t1' (the DC balancing section is high positive in this instance) and a shaking section S essentially identical to those already described with reference to FIG. 5A, the waveform of FIG. 5D comprises (i) a short period of duration t17 of a high positive potential difference VH1 (note that in this instance there is no period of zero voltage between the shaking section S and the application of a high driving potential difference) (ii) a period of zero voltage of duration t18; and a period of a low negative potential difference VL2 for a period t19 longer than t17. Typically, the magnitude of VL2 is about half that of VH1, t18 is comparable in length to t17 and t19 is about ten times as large as t17. For example, each of t6 and t7 may be 50 msec, while t8 may be 500 msec. Steps (i), (ii) and (iii) are then repeated several times, as shown in FIG. 5D; typically, these steps may be repeated 6-10 times. However, to ensure a pure white color, it has been found advantageous to follow the repetitions of steps (i), (ii) and (iii) with (iv) a period for zero potential difference of duration t20; (v) application of the low negative potential difference VL2 for a period t21; and repetition of steps (iv) and (v). Typically, steps (iv) and (v) will be repeated 6-10 times, t20 will be comparable to t18, and t21 will be shorter than t19. As will readily be apparent, the number of applications of VH1 and VL2 and the durations t17, t18, t19, t20 and t21 in this waveform can be adjusted empirically.

Figure 5E:
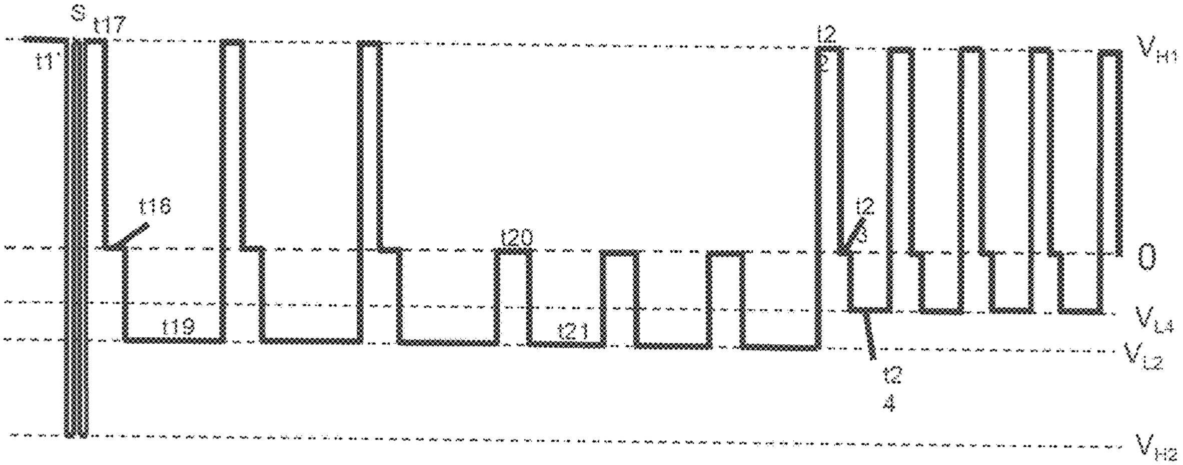

FIG. 5E illustrates the waveform used to effect the transition of FIG. 3E to produce a blue optical state (i.e., the color of the first particle). Not surprisingly, the first part of the waveform shown in FIG. 5E is identical to the "white" waveform shown in FIG. 5D. However, after the repetitions of steps (iv) and (v) discussed in the preceding paragraph, the waveform of FIG. 5E continues with (vi) application of the high positive potential difference VH1 for a period t22 shorter than t17; (vii) application of zero potential difference for a period t23 shorter than t18; (viii) application of a low negative potential difference VL4, having a smaller magnitude than VL2 for a period t24 shorter than t19 or t21; and repetition of steps (vi)-(viii), but ending with a repetition of step (vi) not followed by a repetition of step (viii), i.e., with a final positive drive pulse, as described above with reference to FIG. 3E. Typically, the magnitude of VL4 is about 75 percent that of VL2, and typically steps (vi)-(viii) may be repeated 10-20 times. As will readily be apparent, the number of applications of VH1 and VL4 and the durations t22, t23 and t24 in this waveform can be adjusted empirically.

Figure 5F:
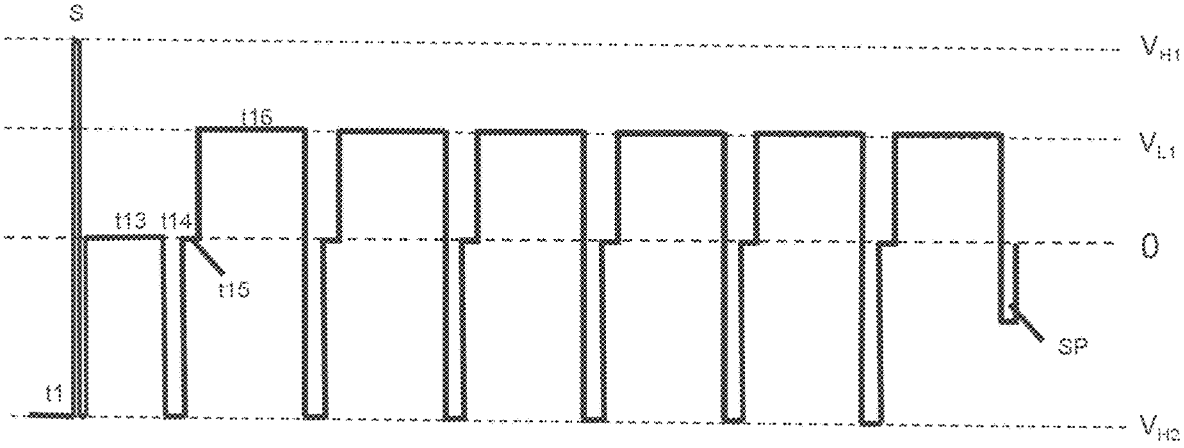

FIG. 5F shows the waveform used to effect the transition shown in FIG. 3F to produce an orange optical state. The waveform shown in FIG. 5F is identical to the "red" waveform shown in FIG. 5C except for the addition of final short low negative potential difference pulse SP, the impulse of which is insufficient to drive the electrophoretic medium from the red optical state (R) to the yellow optical state (Y) (see FIG. 3B). The magnitude and duration of the pulse SP can vary widely and the optical combination of magnitude and duration may be determined empirically.

Figure 5G:
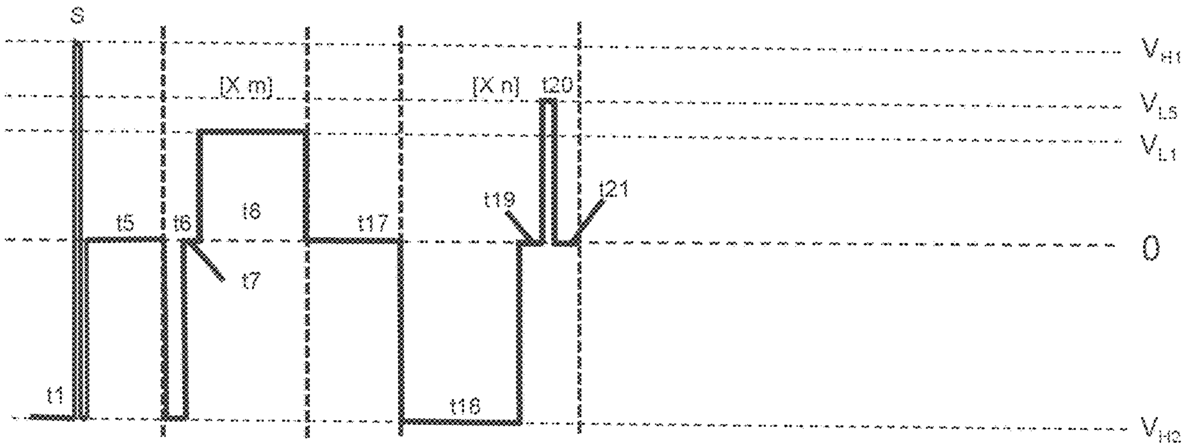

Finally, FIG. 5G shows the waveform used to generate the green optical state shown in FIG. 3G. The first part of the waveform shown in FIG. 5G, up to period t8, is identical to the "red" waveform shown in FIG. 5C. However, this "red" waveform is followed by a period t17 of zero voltage, typically lasting about 250-450 msec. This period t17 of zero voltage is followed by several repetitions of:

(i) a high negative potential difference pulse of duration t18, typically about lasting about 250-450 msec.;

(ii) a short period t19 of zero voltage, typically not more than about 50 msec.;

(iii) a short period t20 of an intermediate positive voltage $V_{L5}$ (where $V_{L1}<V_{L5}<V_{H1}$) of duration t20, typically lasting about 250-450 msec., and (iv) a second short period t21 of zero voltage, typically not more than about 50 msec. (The final repetition of step (iv) may of course be omitted.)

A four particle electrophoretic medium as shown in FIG. 1 was formulated using the aforementioned Kremer 45030 as a partially light-transmissive blue pigment, a rutile titania white pigment and light reflective 1254 DPP Red 254 (available from DCL Corporation) and Novoperm Yellow HR 70-EDS (available from Clariant Corporation, Holden MA) in Isopar E, with the addition of a charge control agent pigments. Even using non-optimized waveforms, the following five colors were produced:

Table

| Color | L* | a * | b* |
|---|---|---|---|
| White | 63 | −2.4 | 2.6 |
| Blue | 30.2 | 4.2 | −35.4 |
| Red | 26.8 | 37.9 | 24.6 |
| Yellow | 58.8 | 4.6 | 54.2 |
| Black | 13.1 | 7.2 | −8.5 |

Figure 6:
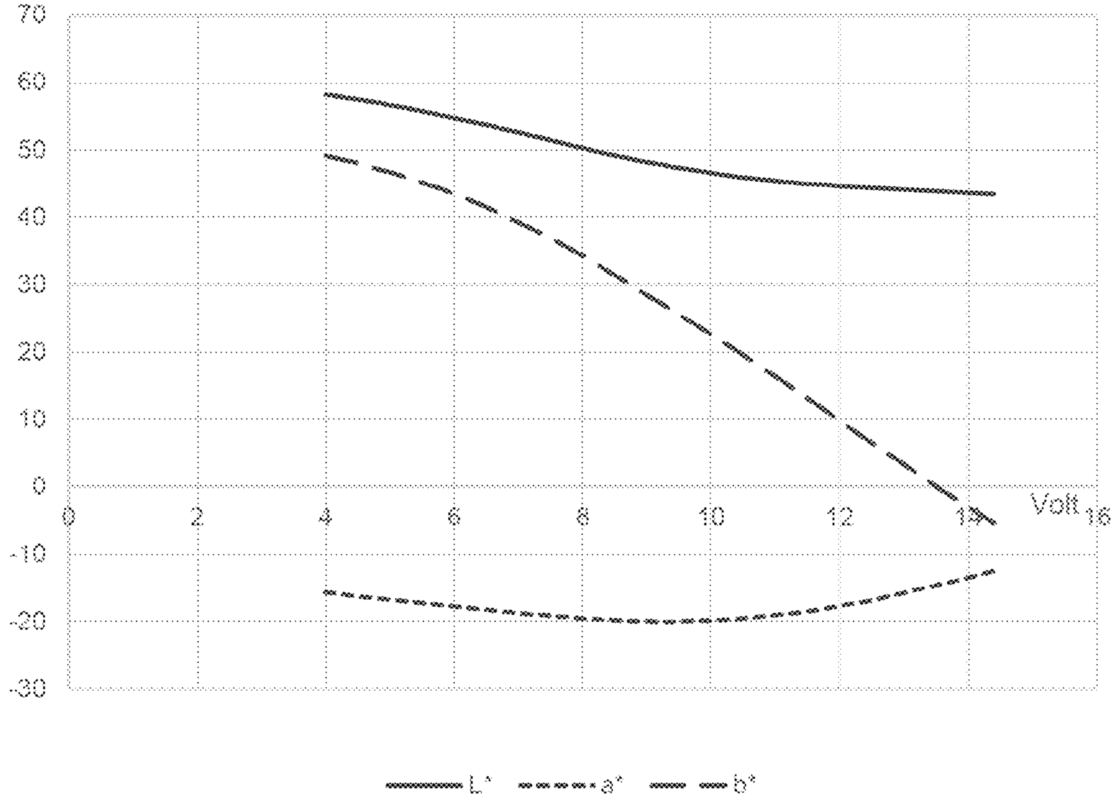
FIG. 6 is a graph showing the variation of the green color achieved in the transition of FIG. 3G as a function of one of the driving voltage pulses applied using the waveform of FIG. 5G.

This four particle electrophoretic medium was also found to produce a green color using the waveform shown in FIG. 5G with t17=t18=350 msec, and t19=t20=t21=40 msec. It was found that the green color produced varied significantly depending upon the value of $V_{L5}$, and FIG. 6 plots the L*, a* and b* values of the greens produced as a function of $V_{L5}$. From FIG. 6, it will be seen that the variation of a* with $V_{L5}$ is much less than that of b*, and hence that by careful choice of $V_{L5}$ one can obtain colors varying from yellow green to cyan-tinted green.

The electrophoretic medium shown in FIGS. 1, 3A-3G and 5A-5G can display the seven colors shown in FIG. 3A-3G respectively; additional colors may be generated by areal modulation (dithering).

From the foregoing, it will be seen that the present invention can provide a four particle electrophoretic medium which can generate at least six useful colors using only four different types of particles.

The electrophoretic media and devices of the present invention may make of use of any of the particles, fluids, encapsulation materials and electrophoretic device designs described in the prior art, as set out for example in the following:

(a) Electrophoretic particles, fluids and fluid additives; U.S. Pat. Nos. 7,002,728 and 7,679,814;

(b) Capsules, binders and encapsulation processes; U.S. Pat. Nos. 6,922,276 and 7,411,719;

(c) Microcell structures, wall materials, and methods of forming microcells; U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,826,129; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; 9,238,340; 9,470,950; 9,554,495; 9,563,099; 9,733,540; 9,778,536; 9,835,925; 10,444,591; and 10,466,564; and U.S. Patent Applications Publication Nos. 2007/0237962; 2009/0168067; and 2011/0164301;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605, 354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; 9,423,666; 9,436,056; 9,459,510; 9,513,527; 9,541,814; 9,552,780; 9,640,119; 9,646,547; 9,671,668; 9,697,778; 9,726,959; 9,740,076; 9,759,981; 9,761,181; 9,778,538; 9,779,670; 9,779,671; 9,812,073; 9,829,764; 9,921,451; 9,922,603; 9,989,829; 10,032,419; 10,036,929; 10,036,931; 10,332,435; 10,339,876; 10,353,266; 10,366,647; 10,372,010; 10,380,931; 10,380,955; 10,431,168; 10,444,592; 10,467,984; 10,475,399; 10,509,293; and 10,514,583; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2015/0103394; 2015/0118390; 2015/0124345; 2015/0268531; 2015/0301246; 2016/0026062; 2016/0048054; and 2016/0116818;

(h) Methods for driving displays; see for example U.S. Pat. Nos. 7,012,600 and 7,453,445; and (i) Applications of displays; see for example U.S. Pat. Nos. 7,312,784 and 8,009,348.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display.

The manufacture of a three-layer electrophoretic display normally involves at least one lamination operation. For example, in several of the aforementioned patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

As discussed in the aforementioned U.S. Pat. No. 6,982,178, (see column 3, line 63 to column 5, line 46) many of the components used in electrophoretic displays, and the methods used to manufacture such displays, are derived from technology used in liquid crystal displays (LCD's). For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to encapsulated electrophoretic displays. Because the electrophoretic material is typically solid (i.e., has solid outer surfaces), it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electrophoretic medium sandwiched between two adhesive layers, one or both of the adhesive layers being covered by a release sheet. Another form of the double release sheet comprises a layer of a solid electrophoretic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U. S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electrophoretic medium; and a release sheet. This inverted front plane laminate is used to form an electro-optic display having a layer of lamination adhesive between the electrophoretic layer and the front electrode or front substrate; a second, typically thin layer of adhesive may or may not be present between the electrophoretic layer and a backplane. Such electro-optic displays can combine good resolution with good low temperature performance.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving an electrophoretic display comprising a layer of an electrophoretic medium having a viewing surface on one side thereof, and a second surface on the opposed side thereof, the electrophoretic display further comprising voltage control means for applying an electric field through the layer of electrophoretic medium, the electrophoretic medium comprising a fluid and first, second, third and fourth types of particles dispersed in the fluid, the first, second, third and fourth types of particles having respectively first, second, third and fourth colors differing from one another, the first and third types of particles having charges of one polarity and the second and fourth types of particles having charges of the opposite polarity, the first type of particles having a greater zeta potential or electrophoretic mobility than the third type of particles, and the second type of particles having a greater zeta potential or electrophoretic mobility than the fourth type of particles, wherein one of the types of particles is white, one of the types of non-white particles is partially light-transmissive, and the remaining two types of non-white particles are light-reflective, the driving method comprising:

(i) driving the electrophoretic medium to display the third color at the viewing surface;

(ii) applying zero volts across the electrophoretic medium for a first period of time;

(iii) after step (ii), applying a first driving voltage for a second period of time, the first driving voltage having a polarity driving the second and fourth particles towards the viewing surface;

(iv) applying zero volts across the electrophoretic medium for a third period of time;

(v) after step (iv), applying a second driving voltage for a fourth period of time, the second driving voltage having a polarity opposite to, and a magnitude less than, the first driving voltage, and the fourth period being less than the second period, thereby causing the color of a mixture of the first and second types of particles to be displayed at the viewing surface.

2. The driving method of claim 1 wherein steps (ii)-(v) are repeated at least four times.

3. The driving method of claim 1 wherein step (i) is effected by:

a) applying a third driving voltage for a fifth period of time, the third driving voltage having the same polarity and substantially the same magnitude as the first driving voltage, but the fifth period of time being less than the second period of time;

b) after step a), applying a fourth driving voltage for a sixth period of time, the fourth driving voltage having the same polarity, and a magnitude less than, the second driving voltage, and the sixth period of time being greater than the fourth period of time.

4. The driving method of claim 3 wherein step (i) is carried out starting from a mixed state, in which all four types of particles are randomly distributed.

5. The driving method of claim 3 wherein a period of zero voltage is inserted between steps a) and b).

6. The driving method of claim 1 wherein the white particles are the fourth type of particles.

7. The driving method of claim 6 wherein the partially light-transmissive type of particles are the first type of particles.

8. The driving method of claim 7 wherein the first and third types of particles have optical characteristics such that a mixture of the two types of particles absorbs substantially all visible radiation.

9. The driving method of claim 1 wherein the fourth particle is white, the second particle is yellow, the first particle is blue and light-transmissive, and the third particle is red.

10. The driving method of claim 1 wherein the fourth particle is white, the second particle is yellow, the first particle is red and light-transmissive, and the third particle is blue.

11. The driving method of claim 1 wherein the layer of light-transmissive pigment has a contrast ratio of not more than about 0.5.

12. The driving method of claim 11 wherein the layer of light-transmissive pigment has a contrast ratio of not more than about 0.3.

* * * * *